United States Patent Office 3,753,878
Patented Aug. 21, 1973

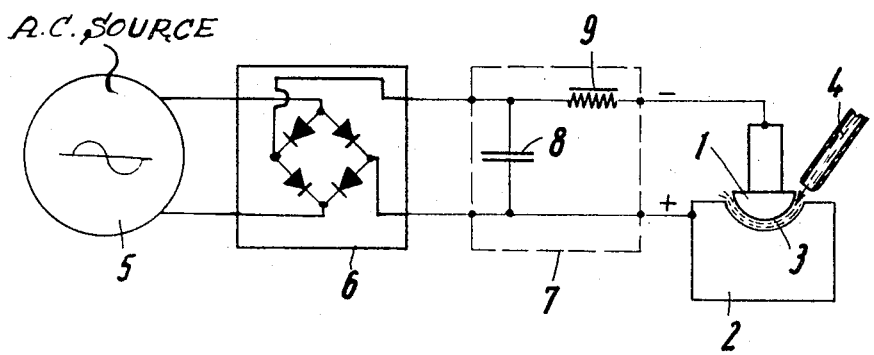

3,753,878
METHOD OF ELECTROCHEMICALLY MACHINING TITANIUM OR TITANIUM ALLOY WORKPIECES
Peter Gosger, Burg (Wupper), Germany, assignor to AEG-Elotherm G.m.b.H., Remscheid-Hasten, Germany
Filed Sept. 21, 1971, Ser. No. 182,462
Claims priority, application Germany, Oct. 7, 1970, P 20 49 196.7
Int. Cl. B23p 1/00
U.S. Cl. 204—129.1
3 Claims

ABSTRACT OF THE DISCLOSURE

A method and apparatus for electrochemically machining workpieces of titanium or titanium alloy which have not been hitherto amenable to such machining because of the rough surfaces which result. It has been found that substantially eliminating the ripple in the rectified A.C. signal applied to the workpiece for machining produces satisfactorily smooth surfaces on titanium or titanium alloy workpieces and this can be accomplished by passing the rectified signal through a low frequency filter circuit.

---

The invention relates to a method of and apparatus for electrochemically machining titanium or titanium alloy workpieces.

To conventionally electrochemically countersink geometrical configurations into or electrochemically dress workpieces, a direct electrolysing potential which is negative in relation to the potential of the workpiece is applied to a suitably shaped tool electrode while a continuous flow of electrolyte is maintained between the electrode and the workpiece. The direct electrolysing potential is usually obtained from an A.C. source by rectification.

This electrochemical machining process has the well-known advantage of being capable of producing complicated workpiece configurations and of providing smoothly dressed workpiece edges quickly and cheaply. The workpiece surfaces obtained by this method are generally smooth and a final surface finishing treatment is usually unnecessary. However, parts made of titanium or titanium alloys—which have gained considerable importance in recent years because of their high temperature resistance and relatively low specific gravity—exhibit extremely rough surfaces when electrochemically machined, contrary to other metal materials. This phenomenon has hitherto blocked the application of electrochemical machining techniques to titanium and titanium alloys.

The present invention relates to a method and apparatus which will permit surfaces of very low surface roughness to be obtained by electrochemically machining titanium or titanium alloys.

We have discovered that, in conventional electrochemical machining devices, the still considerable voltage fluctuation or ripple of the electrolysing potential obtained from an A.C. source by a conventional rectifier such as a full wave bridge rectifier—in contradistinction to the conditions that apply in the case of other materials—plays an important part in the machining of titanium or of a titanium alloy. Based on this discovery the method proposed by the present invention comprises in, at least substantially, suppressing the ripple of A.C. voltage frequency and harmonics thereof in an electrolysing potential derived in conventional manner from an A.C. source by rectification. Any fluctuations that still remain after the suppression of the ripple voltages should preferably be less than 4% and particularly less than 2% of the mean electrolysing voltage.

For performing the method according to the invention apparatus according to the invention preferably includes at least one low frequency filter element between the rectifier circuit supplying the electrolysing voltage and the electrolysing electrode.

The invention will be hereinafter more particularly described with reference to the accompanying drawing which is a functional diagram of the proposed apparatus. A conventional tool electrode is connected to receive a potential that is negative relative to the potential of workpiece. A continuous stream of electrolyte (for instance a 10% solution of KCl) is conventionally maintained—as schematically indicated by 4—in the electrolysing gap 3 between the tool electrode 1 and the workpiece 2.

The direct electrolysing potential is derived from a conventional source of A.C. 5 via a conventional rectifying circuit 6, such as a full wave bridge. By means of a low frequency filter network comprising a capacitor 8 and an inductor or reactor 9 connected to rectifier circuit 6, fluctuations of the electrolysing potential which are due to the A.C. frequency and harmonics thereof are largely eliminated from the voltage across electrolysing gap 3. The values for the elements of filter 7 are preferably chosen so that the fluctuations in the electrolysing gap are less than 4% and preferably less than 2% of the mean electrolysing D.C. voltage.

In many instances this desired effect can also be attained by omitting the capacitor 8 in which case the filter element would merely consist of the low frequency choke connected in series with the electrolysing gap 3. Many other changes and modifications in the above embodiment of the invention can of course be made without departing from the scope of the invention and accordingly that scope is intended to be limited only by the scope of the appended claims.

What is claimed is:

1. A method for electrochemically machining a workpiece of titanium or titanium alloy comprising the steps of:
    rectifying an alternating current signal so as to produce a D.C. signal having a ripple,
    substantially suppressing said ripple in said D.C. signal having a ripple and
    applying said D.C. with said ripple suppressed to said workpiece.

2. A method as in claim 1 wherein said step of suppressing includes the step of maintaining fluctuations of said D.C. signal about a mean D.C. voltage within 4% of the mean D.C. voltage.

3. A method as in claim 2 wherein said step of suppressing includes the step of maintaining fluctuations of said D.C. signal about a mean D.C. voltage within 2% of the mean D.C. voltage.

References Cited
UNITED STATES PATENTS
3,284,691   11/1966   Schulz et al. _____ 204—143 M

OTHER REFERENCES

De Barr et al.: Electrochemical Machining, Macdonald Ltd, 1968, London, pp. 190–1.

Angel., Jr.: Electronic Circuits, 1958, McGraw-Hill, N.Y. pp. 21–31.

FREDERICK C. EDMUNDSON, Primary Examiner

U.S. Cl. X.R.
204—224